United States Patent
Wang et al.

(10) Patent No.: US 9,954,621 B2
(45) Date of Patent: Apr. 24, 2018

(54) METHOD AND DEVICE FOR COMPENSATING PHASE DEVIATION

(71) Applicant: ZTE CORPORATION, Shenzhen (CN)

(72) Inventors: Weiming Wang, Shenzhen (CN); Minming Geng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/318,190

(22) PCT Filed: Sep. 25, 2014

(86) PCT No.: PCT/CN2014/087402
§ 371 (c)(1),
(2) Date: Dec. 12, 2016

(87) PCT Pub. No.: WO2015/188517
PCT Pub. Date: Dec. 17, 2015

(65) Prior Publication Data
US 2017/0134098 A1    May 11, 2017

(30) Foreign Application Priority Data
Jun. 12, 2014   (CN) .......................... 2014 1 0260927

(51) Int. Cl.
*H04B 10/00* (2013.01)
*H04B 10/61* (2013.01)

(52) U.S. Cl.
CPC ................ *H04B 10/6165* (2013.01)

(58) Field of Classification Search
CPC .. H04B 10/6165; H04B 10/613; H04B 10/61; H04B 10/0775; H04B 10/07953;
(Continued)

(56) References Cited

U.S. PATENT DOCUMENTS 7,209,670 B2 * 4/2007 Fludger .............. H04B 10/2569
398/205
7,706,696 B2 * 4/2010 Gronbach ................. G02F 1/35
398/198
(Continued)

FOREIGN PATENT DOCUMENTS

CN  101553028 A  10/2009
CN  103259756 A  8/2013

OTHER PUBLICATIONS

PCT International Search Report dated Mar. 18, 2015, Application No. PCT/CN2014/087402, 3 Pages.
(Continued)

*Primary Examiner* — Hibret Woldekidan
(74) *Attorney, Agent, or Firm* — Plumsea Law Group, LLC

(57) ABSTRACT

The present document provides a method and device for compensating a phase deviation, which are applied to a data sequence between a first training sequence and a second training sequence which are received by a receiving end; The method includes: determining a first phase difference between a first training sequence and a standard training sequence used for reference, and a second phase difference between a second training sequence and the standard training sequence; determining a subdata sequence requiring a phase compensation in multiple subdata sequences forming the data sequence according to the first phase difference and the second phase difference; calculating a phase compensation value corresponding to the subdata sequence requiring the phase compensation by using the first phase difference and the second phase difference; and conducting the phase compensation on the subdata sequence requiring the phase compensation by using the phase compensation value corresponding to the subdata sequence.

10 Claims, 3 Drawing Sheets

(58) Field of Classification Search
CPC ...... H04B 10/5561; H04B 3/32; H04B 7/084; H04L 2027/0067; H04L 7/04; H04L 2027/0038; H04L 25/0212; H04L 27/0014; H04L 7/0029
USPC .................. 398/208, 209, 25, 188, 202, 205
See application file for complete search history.

(56) References Cited

U.S. PATENT DOCUMENTS

| | | | | |
|---|---|---|---|---|
| 8,432,961 | B2* | 4/2013 | Choi | H04L 1/0065 375/232 |
| 8,489,961 | B2* | 7/2013 | Song | H03M 13/1515 714/756 |
| 8,532,502 | B2* | 9/2013 | Zhang | H04B 10/61 375/232 |
| 8,705,956 | B2* | 4/2014 | Cao | H04L 27/2659 370/203 |
| 9,014,574 | B2* | 4/2015 | Arikawa | H04B 10/614 398/205 |
| 9,071,327 | B2* | 6/2015 | Ram | H04L 27/266 |
| 9,100,262 | B2* | 8/2015 | Nam | H04L 27/0014 |
| 2004/0071234 | A1* | 4/2004 | Li | H04L 25/03273 375/341 |
| 2008/0013616 | A1* | 1/2008 | Kim | H04H 20/57 375/232 |
| 2009/0129514 | A1* | 5/2009 | Twitto | H04L 27/0014 375/341 |
| 2011/0150505 | A1 | 6/2011 | Roberts et al. | |
| 2011/0154159 | A1* | 6/2011 | Tanaka | H03M 13/091 714/758 |
| 2011/0255864 | A1* | 10/2011 | Cao | H04L 27/2659 398/25 |
| 2016/0006532 | A1* | 1/2016 | Chang | G01S 13/9303 398/79 |
| 2016/0013863 | A1* | 1/2016 | Dou | H04B 10/07953 398/32 |
| 2016/0309244 | A1* | 10/2016 | Ma | H04Q 11/0005 |

OTHER PUBLICATIONS

Extended European Search Report dated May 4, 2017, Application No. EP 14894520.7, 10 Pages.

Xie Chongjin et al., "Digital PLL Based Frequency Offset Compensation and Carrier Phase Estimation for 16-QAM Coherent Optical Communication Systems," 2012 38th European Conference and Exhibition on Optical Communications, OSA, Sep. 16, 2012, 3 Pages.

* cited by examiner

US 9,954,621 B2

METHOD AND DEVICE FOR COMPENSATING PHASE DEVIATION

CROSS-REFERENCE TO RELATED APPLICATIONS

This application is the U.S. national phase of PCT Application No. PCT/CN2014/087402 filed on Sep. 25, 2014, which claims priority to Chinese Patent Application No. 201410260927.9 filed on Jun. 12, 2014, the disclosures of which are incorporated in their entirety by reference herein.

TECHNICAL FIELD

The present document relates to the field of signal transmission, and in particular, to a method and device for compensating a phase deviation.

BACKGROUND

In coherent detection high-speed optical transmission system, due to the phase deviation between the corrected emission laser and the local oscillator laser at the receiving end, in order to eliminate the effects of the phase deviation on the signal judgment, the phase estimation algorithm is often used to compensate the phase deviation.

The VITERBI-VITERBI algorithm is a classical phase estimation algorithm. Its basic principle is to perform a biquadrate process to the phase of the received signal, then perform weighted average, and extract a phase compensation value. Because of the biquadrate operation, it is resulted that there is a phase ambiguity of positive and negative $\pi/2$ in the recovered phase. The phase ambiguity is solved mainly by estimating a phase offset through a mode of adding a training sequence. That is, the transmitting end introduces a standard training sequence among various data sequences when a data signal is sent, and the receiving end performs phase correction on a corresponding data sequence through a phase difference between the received training sequence and the standard training sequence after receiving the data signal.

In the traditional phase ambiguity training scheme, a section of training sequence is responsible for correcting the phase to a section of data sequence. FIG. 1 is a schematic diagram of phase ambiguity occurred in a middle part of an existing data sequence. As shown in FIG. 1, assuming that phase ambiguity is generated at the middle part of the data sequence (i.e., shaded area), in the existing phase ambiguity training method, the receiving end is unable to identify the phase ambiguity in the middle of the data sequence through the training sequence, therefore, in order to avoid the occurrence of the above situation, a section of data sequence should not be set to be too long, that is, a large number of training sequences are required to be introduced into the whole data signal to ensure the accuracy of the phase correction, thus, it will inevitably lead to excessive bandwidth cost.

SUMMARY

The embodiment of the present document provides a method and device for compensating a phase deviation, which can improve capability of a receiving end to correct a phase deviation in a data sequence.

In order to solve the above technical problem, the embodiment of the present document provides a method for compensating a phase deviation, which is applied to a data sequence between a first training sequence and a second training sequence which are received by a receiving end, including:

determining a subdata sequence requiring phase compensation in multiple subdata sequences forming the data sequence according to the first phase difference and the second phase difference;

herein, determining a subdata sequence requiring a phase compensation in multiple subdata sequences forming the data sequence according to the first phase difference and the second phase difference specifically includes:

if the first phase difference is less than a first threshold and |the second phase difference subtracted by the first phase difference| is greater than a second threshold, then only determining that subdata sequences located in latter half of the data sequence require the phase compensation; and if the first phase difference is greater than the first threshold, then determining that all the subdata sequences of the data sequence require the phase compensation.

Herein, calculating the phase compensation value corresponding to the subdata sequence requiring the phase compensation by using the first phase difference and the second phase difference specifically includes:

calculating a first compensation value corresponding to the first phase difference and a second phase compensation value corresponding to the second phase difference;

if the first phase difference is less than a first threshold and |the second phase difference subtracted by the first phase difference| is greater than a second threshold, then determining the compensation value of subdata sequences located in latter half of the data sequence as the second compensation; and if the first phase difference is greater than the first threshold and |the second phase difference subtracted by the first phase difference| is greater than the second threshold, then determining the compensation value of subdata sequences located in former half of the data sequence as the first compensation and determining the compensation value of subdata sequences located in latter half of the data sequence as the second compensation; and if the first phase difference is greater than the first threshold and |the second phase difference subtracted by the first phase difference| is less than the second threshold, then determining the compensation value of all subdata sequences of the data sequence as the first compensation.

Herein, calculating the first compensation value corresponding to the first phase difference and the second phase compensation value corresponding to the second phase difference specifically includes:

quantifying the phase difference between the first training sequence and the standard training sequence, to obtain a first value possessing a phase; and quantify the phase difference between the second training sequence and the standard training sequence, to obtain a second value possessing the phase; and calculating the first compensation value according to the first value and a preset ideal constellation point, and calculating the second phase compensation value according to the second value and the preset ideal constellation point.

Herein, quantifying the phase difference between the first training sequence and the standard training sequence, to obtain the first value possessing the phase; and quantifying the phase difference between the second training sequence and the standard training sequence to obtain the second value possessing the phase specifically includes:

determining the phase difference between each symbol in the first training sequence and a corresponding symbol in the standard sequence, to obtain the phase difference of each symbol in the first training sequence;

determining the phase difference between each symbol in the second training sequence and a corresponding symbol in the standard sequence, to obtain the phase difference of each symbol in the second training sequence;

quantifying the phase difference of each symbol in the first training sequence according to Euler's formula, to obtain a first quantization value possessing the phase of each symbol in the first training sequence, and quantifying the phase difference of each symbol in the second training sequence according to Euler's formula, to obtain a second quantization value possessing the phase of each symbol in the second training sequence; and calculating a mean value of all first quantization values, to obtain the first value possessing the phase, and calculating the mean value of all second quantization values, to obtain the second value possessing the phase.

Another embodiment of the present document further provides a device for compensating a phase deviation, which is applied to a data sequence between a first training sequence and a second training sequence which are received by a receiving end, including:

a first determination module, arranged to: determine a first phase difference between the first training sequence and a standard training sequence used for reference, and a second phase difference between the second training sequence and the standard training sequence;

a second determination module, arranged to: determine a subdata sequence requiring a phase compensation in multiple subdata sequences forming the data sequence according to the first phase difference and the second phase difference;

a calculation module, arranged to: calculate a phase compensation value corresponding to the subdata sequence requiring the phase compensation by using the first phase difference and the second phase difference; and a compensation module, arranged to: conduct the phase compensation on the subdata sequence requiring the phase compensation by using the phase compensation value corresponding to the subdata sequence.

Herein, the second determination module specifically includes:

a first determination submodule, arranged to: if the first phase difference is less than a first threshold and |the second phase difference subtracted by the first phase difference| is greater than a second threshold, then only determine that subdata sequences located in latter half of the data sequence require the phase compensation; and a second determination submodule, arranged to: if the first phase difference is greater than the first threshold, then determine that all the subdata sequences of the data sequence require the phase compensation.

Herein, the calculation module specifically includes:

a calculation submodule, arranged to: calculate a first compensation value corresponding to the first phase difference and a second phase compensation value corresponding to the second phase difference;

a third determination submodule, arranged to: if the first phase difference is less than a first threshold and |the second phase difference subtracted by the first phase difference| is greater than a second threshold, then determine the compensation value of subdata sequences located in latter half of the data sequence as the second compensation;

a fourth determination submodule, arranged to: if the first phase difference is greater than the first threshold and |the second phase difference subtracted by the first phase difference| is greater than the second threshold, then determine the compensation value of subdata sequences located in former half of the data sequence as the first compensation value and determine the compensation value of subdata sequences located in latter half of the data sequence as the second compensation value; and a fifth determination submodule, arranged to: if the first phase difference is greater than the first threshold and |the second phase difference subtracted by the first phase difference| is less than the second threshold, then determine the compensation value of all subdata sequences of the data sequence as the first compensation value.

Herein, the calculation submodule includes:

a quantization unit, arranged to: quantify the phase difference between the first training sequence and the standard training sequence, to obtain a first value possessing a phase; and quantify the phase difference between the second training sequence and the standard training sequence, to obtain a second value possessing the phase; and a calculation unit, arranged to: calculate the first compensation value according to the first value and a preset ideal constellation point, and calculate the second phase compensation value according to the second value and the preset ideal constellation point.

Herein, the quantization unit includes:

a first determination subunit, arranged to: determine the phase difference between each symbol in the first training sequence and a corresponding symbol in the standard sequence, to obtain the phase difference of each symbol in the first training sequence;

a second determination subunit, arranged to: determine the phase difference between each symbol in the second training sequence and the corresponding symbol in the standard sequence, to obtain the phase difference of each symbol in the second training sequence;

a quantization subunit, arranged to: quantify the phase difference of each symbol in the first training sequence according to Euler's formula, to obtain a first quantization value possessing the phase of each symbol in the first training sequence, and quantify the phase difference of each symbol in the second training sequence according to Euler's formula, to obtain a second quantization value possessing the phase of each symbol in the second training sequence; and a calculation subunit, arranged to: calculate a mean value of all first quantization values, to obtain the first value possessing the phase, and calculate the mean value of all second quantization values, to obtain the second value possessing the phase.

The beneficial effects of the above technical scheme of the present document are as follows:

The scheme of the present document divides a section of data sequence into multiple subdata sequences, and determines whether each subdata sequence requires the phase compensation according to two training sequences before and after the data sequence, and determines a phase compensation value corresponding to a subdata sequence requiring the phase compensation. Compared with the related art, the accuracy of the phase correction of the present scheme is much higher, therefore, in the transmission process, it can send a longer data sequence, that is, the compensation method of the present embodiment introduces less training sequence than the related art when transmitting same amount of data quantity, thus saving the bandwidth resources.

EMBODIMENTS OF THE PRESENT DOCUMENT

In order to make the technical problem to be solved, the technical scheme and the advantage of the present document much more clear and obvious, it will be described in detail with reference to the accompanying drawings and the specific embodiments hereinafter.

Figure 1:
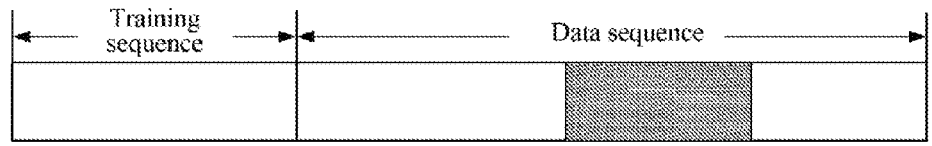
FIG. 1 is a schematic diagram of phase ambiguity occurred in a middle part of an existing data sequence.
Figure 2:
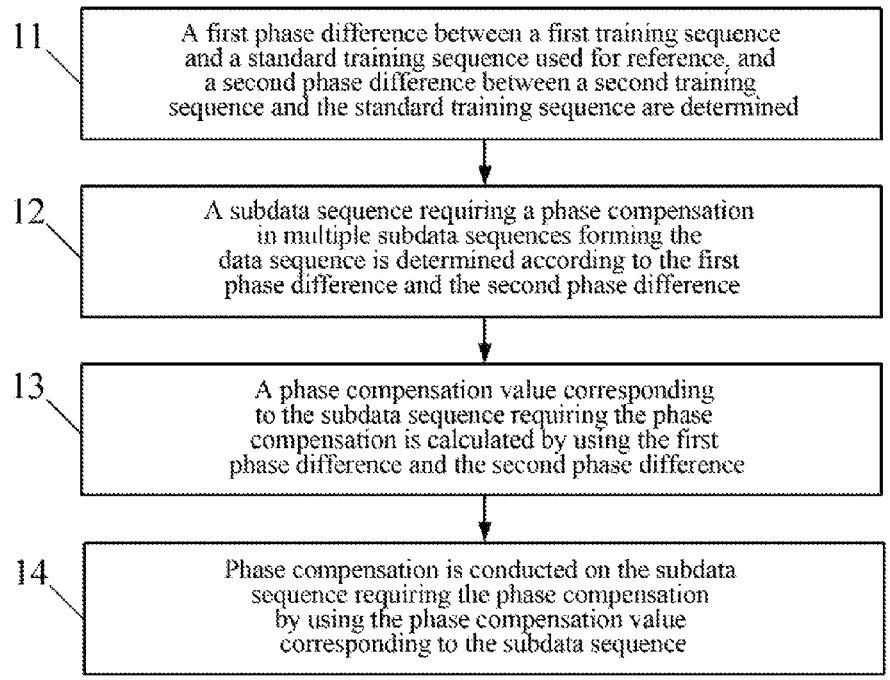
FIG. 2 is a schematic diagram of steps of a method for compensating a phase deviation of the present document.

An embodiment of the present document provides a method for compensating a phase deviation, which is applied to a data sequence between a first training sequence and a second training sequence which are received by a receiving end, as shown in FIG. 1, including the following steps:

in step 11, a first phase difference between the first training sequence and a standard training sequence used for reference, and a second phase difference between the second training sequence and the standard training sequence are determined;

in step 12, a subdata sequence requiring a phase compensation in multiple subdata sequences forming the data sequence is determined according to the first phase difference and the second phase difference;

in step 13, a phase compensation value corresponding to the subdata sequence requiring the phase compensation is calculated by using the first phase difference and the second phase difference; and in step 14, the phase compensation is conducted on the subdata sequence requiring the phase compensation by using the phase compensation value corresponding to the subdata sequence.

It can be known from the above description that, the compensation method of the present embodiment divides a section of data sequence into multiple subdata sequences, and determines whether each subdata sequence requires the phase compensation according to two training sequences before and after the data sequence, and determines a phase compensation value corresponding to a subdata sequence requiring the phase compensation. Compared with the related art, the accuracy of the phase correction of the compensation method of the present document is much higher, therefore, in the transmission process, it can send a longer data sequence, that is, the compensation method of the present embodiment introduces less training sequence than the compensation method of the related art when transmitting same amount of data quantity, thus saving the bandwidth resources.

The compensation method of the present document is introduced in detail by combining two implementation modes hereinafter.

<Implementation Mode One>

Figure 3:
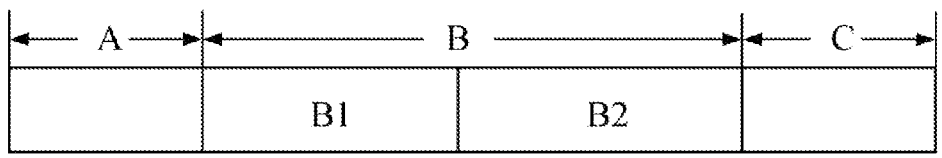
FIGS. 3 and 4 are structural schematic diagrams of a data sequence and a training sequence when specifically implementing the method for compensating the phase deviation of the present document.

As shown in FIG. 3, in the implementation mode one, a data sequence B composed of multiple subdata sequences is divided into a former half B1 and a latter half B 2. A phase difference between a first training sequence A and a standard training sequence is a first phase difference, and a phase difference between a second training sequence C and the standard training sequence is a second phase difference.

The implementation of the above step 12 includes:

in step 121, if the first phase difference is less than a first threshold and |the second phase difference subtracted by the first phase difference| is greater than a second threshold, then it is only determined that subdata sequences located in latter half of the data sequence require the phase compensation; and in step 122, if the first phase difference is greater than the first threshold, then it is determined that all the subdata sequences of the data sequence require the phase compensation.

It can be known through the description in step 121 and step 122 that, when the first phase difference is less than the first threshold, then it is indicated that the phase difference of the phase of first training sequence A and the phase of the standard training sequence is in the permitted extent, and it is believed that the former half of the subdata sequence B1 near the first training sequence A does not need to perform the phase correction; if at that time, |the second phase difference subtracted by the first phase difference| is greater than a second threshold, then it is indicated that the phase difference between the phase of the second training sequence C and the phase of the first training sequence A is larger, which also means that there is a larger difference between the phase of the second training sequence C and the phase of the standard training sequence, and it is believed that the latter part of the subdata sequence B2 near the second training sequence C needs the phase correction. When the first phase difference is greater than the first threshold, then it is indicated that a phase deviation is occurred at the former half part of the subdata sequence B1, and often a phase deviation may also occur at the latter part of the subdata sequence B2 according to the experience, therefore, it is believed that all subdata sequences require the phase compensation.

The above step 13 is then implemented, specifically including:

in step 131, a first compensation value corresponding to the first phase difference and a second phase compensation value corresponding to the second phase difference are calculated; that is, the first compensation value is a phase compensation value of the first training sequence A and the standard training sequence, and the second compensation value is the phase compensation value of the first training sequence B and the standard training sequence;

in step 132, if the first phase difference is less than a first threshold and |the second phase difference subtracted by the first phase difference| is greater than a second threshold, then the compensation value of subdata sequences located in latter half of the data sequence is determined as the second compensation value;

in step 133, if the first phase difference is greater than the first threshold and |the second phase difference subtracted by the first phase difference| is greater than the second threshold, then the compensation value of subdata sequences located in former half of the data sequence is determined as the first compensation value and the compensation value of subdata sequences located in latter half of the data sequence is determined as the second compensation value; and in step 134, if the first phase difference is greater than the first threshold and |the second phase difference subtracted by the first phase difference| is less than the second threshold, then the compensation value of all subdata sequences of the data sequence is determined as the first compensation value.

Figure 4:
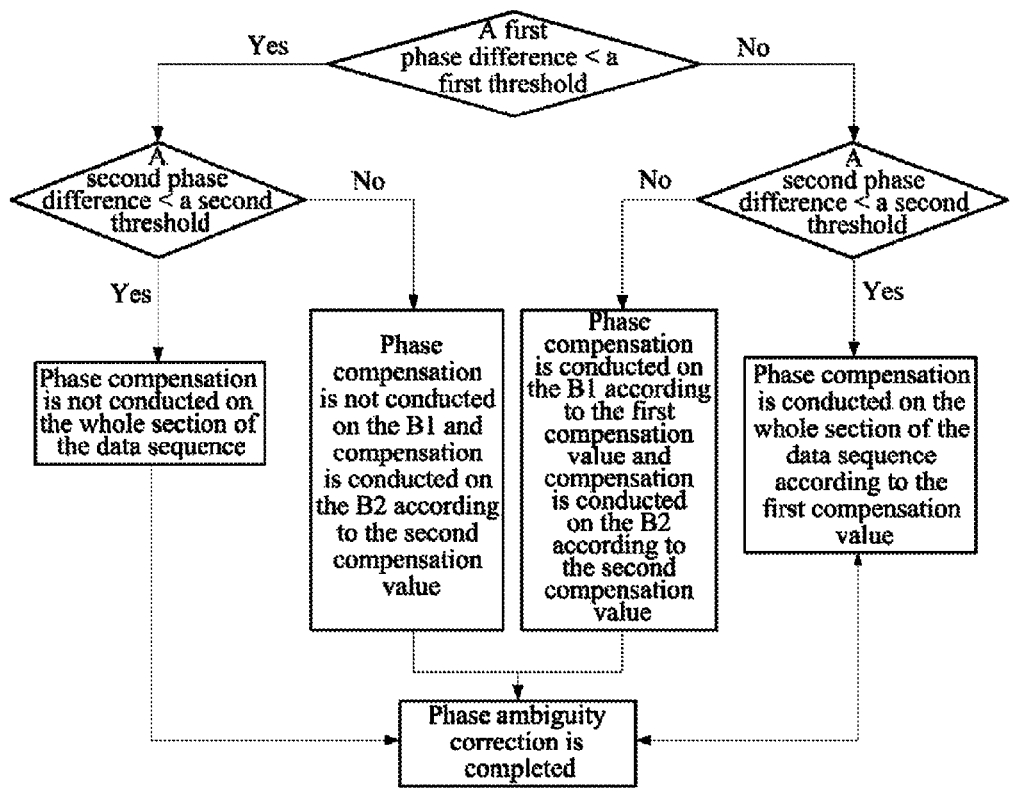

FIG. 4 is a flow chart of actually implementing the above step 13 and step 14. When only the latter half of the subdata sequence B2 requires the phase correction, it is clear that the compensation value corresponding to B2 is more likely to be the second compensation value corresponding to the second training sequence C which is closer to B2. There are two kinds of situations when the former half of the subdata sequence B1 requires the phase correction. One is that the phase ambiguity is occurred at multiple places of the whole data sequence B, and the gap between the phase deviation of B1 and the phase deviation of B2 is larger; at this time, the B1 is performed with the phase correction in accordance with the first compensation value, and the B2 is corrected in accordance with the second compensation value. The other one is that the B1 requires the phase correction, and the difference of the phase of B1 and the phase of B2 is little, then it is indicated that there is a phase deviation across the regions of B1 and B2 in the whole data sequence B; at this time, it is only required to perform the phase correction to the whole section of the data sequence B in accordance with the first compensation value.

It can be seen, the principle of the mathematics dichotomy method is used to perform positioning and correction to the ambiguity phase in the implementation mode one, and the accuracy of its correction is increased nearly double than the traditional methods, which can effectively alleviate the burden of the follow-up work module.

Of course, it is necessary to point out that the present implementation mode further can judge whether the B1 requires the phase correction only through the first phase difference, and judge whether the B2 requires the compensation only through the second phase difference. When the B1 requires the phase compensation, then the B1 is compensated according to the first compensation value. When the B2 requires the phase compensation, then the B2 is compensated according to the second compensation value.

<Implementation Mode Two>

Figure 5:
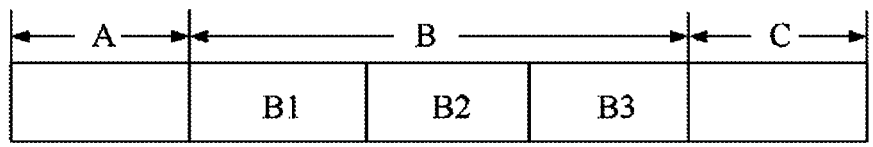
FIG. 5 is a flow chart of implementing the phase compensation in implementation mode one of the present document.

As shown in FIG. 5, in the implementation mode two, a data sequence B composed of multiple subdata sequences is equally divided into three parts, B1, B2 and B3. A phase difference between a first training sequence A and a standard training sequence is a first phase difference, and a phase difference between a second training sequence C and the standard training sequence is a second phase difference.

When the first phase difference is larger than the preset threshold, it is determined that the B1 requires the phase correction, and then its corresponding compensation value is the first compensation value calculated according to the first phase difference;

when the second phase difference is larger than the preset threshold, it is determined that the B3 requires the phase correction, and then its corresponding compensation value is the second compensation value calculated according to the second phase difference;

when a mean value of the first phase difference and the second phase difference is larger than the preset threshold, it is determined that the B2 requires the phase correction, and then its corresponding compensation value is the mean value of the first compensation value and the second compensation value.

It needs to be illustrated that the present document only provides two feasible implementation modes, all technical means which perform phase ambiguity positioning and compensation to the sections of the data sequence according to the first phase difference and the second phase difference should belong to the protection scope of the present document.

Figures 6, 7:
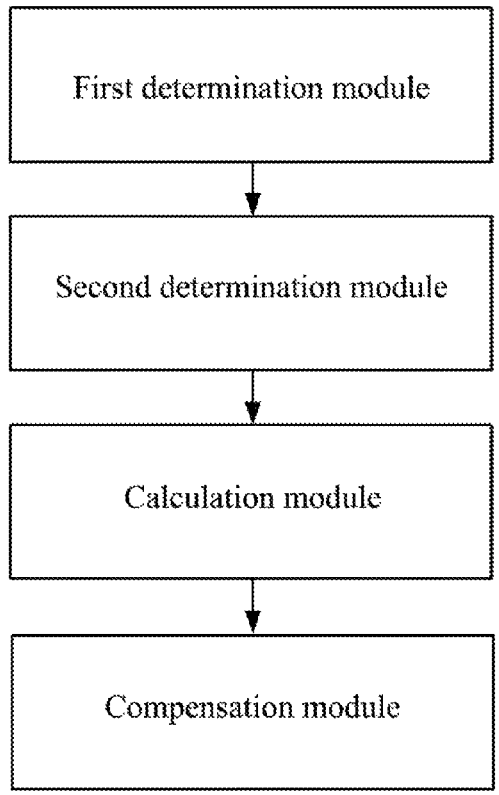
FIG. 6 is structural comparison diagram of data signals transmitted by adopting the method for compensating the phase deviation of the present document and by adopting the current phase deviation compensation method.
FIG. 7 is a structural schematic diagram of a device for compensating a phase deviation of the present document.

In summary, the effect of the compensation method of the present document is as shown in FIG. 6, herein, S1 is a signal transmitted by the existing compensation method, and S2 is a signal transmitted by the compensation method of the present document. As can be seen by comparison, the phase compensation ability of the existing method is poor, therefore, when the same amount of data is transmitted, in order to ensure the quality of the signal, it is required to introduce multiple training sequences, that is, the signal data are divided to multiple sections of data sequences with smaller length for transmission, which will occupy more bandwidth resources than the signal transmitted by the compensation method of the present document.

In addition, on the basis of the above embodiments, the step 13 specifically includes the following steps:

in step 131, the phase difference between the first training sequence and the standard training sequence is quantified, to obtain a first value possessing a phase; and the phase difference between the second training sequence and the standard training sequence is quantified, to obtain a second value possessing the phase;

specifically, the existing training sequence is composed of symbols of multiple phase, and in step 131, the phase difference between each symbol in the first training sequence and the corresponding symbol in the standard sequence is determined, to obtain a phase difference of each symbol in the first training sequence; and the phase difference between each symbol in the second training sequence and the corresponding symbol in the standard sequence is determined, to obtain the phase difference of each symbol in the second training sequence; the phase difference of each symbol in the first training sequence is quantified according to Euler's formula, to obtain a first quantization value possessing the phase of each symbol in the first training sequence, and the phase difference of each symbol in the second training sequence is quantified according to Euler's formula, to obtain a second quantization value possessing the phase of each symbol in the second training sequence; a mean value of all first quantization values is calculated, to obtain the first value possessing the phase, and the mean value of all second quantized values is calculated, to obtain the second value possessing the phase.

In step 132, the first compensation value is calculated according to the first value and a preset ideal constellation point, and the second phase compensation value is calculated according to the second value and the preset ideal constellation point.

The step 131 and step 132 are introduced by a specific embodiment hereinafter.

In the present embodiment, it is assumed that the phase of each symbol of the standard training sequence referenced in the transmission signal by the transmitting end is: $T_0=\phi_x(n), \phi_x(n+1), \ldots \phi_x(n+P-1)$; herein, $n, n+1, \ldots, n+p-1$ are effective numbers of each symbol in the standard training sequence. The phase of each symbol of the first training sequence received first by the receiving end is $T_1=\phi_y(n), \phi_y(n+1), \ldots \phi_y(n+P-1)$, and the phase of each symbol of the second training sequence received later is:

$$T_2=\phi_y(n+1+p), \phi_y(n+1+p+1), \ldots \phi_y(n+1+2p-1),$$

herein, I represents the data sequence between the first training sequence and the second training sequence.

First, the phase difference of each symbol of T1 and T2 with each symbol of the corresponding T0, $$\Delta 1 = \phi_\Delta(n), \phi_\Delta(n+1), \ldots \phi_\Delta(n+P-1)$$

and $$\Delta 2 = \phi_\Delta(n+1+P), \phi_\Delta(n+1+P+1), \ldots \phi_\Delta(n+1+2P-1)$$

are calculated respectively, and then the quantization values corresponding to Δ1 and Δ2 are obtained by using the Euler's formula; the value of Δ1 is corresponding to SΔ1=S(n), S(n+1), . . . S(n+p−1), and the value of Δ2 is corresponding to SΔ2=S(n+I+P), S(n+I+P+1), . . . S(n+I+2p−1). Herein, the Euler's formula is a commonly used method in the mathematical field, and its quantified value still inherits the phase. In the present embodiment, the SΔ1 is regarded as a quantized Δ1, and SΔ2 is regarded as a quantized Δ2. It should be noted that, in the present embodiment, the Euler's formula is used to quantify Δ1 and Δ2 in advance, and the execution order of the quantization steps will not change the final results of the first compensation value and the second compensation value.

And then, the mean value of each symbol in the SΔ1 is calculated, and the phase of that mean value, $$\phi(n),$$

is determined according to that; and the mean value of each symbol in the SΔ2 is calculated, and the phase of that mean value, $$\phi(n+1)$$

is determined according to that.

Finally, the φ(n) and φ(n+1) are corrected to a preset ideal constellation point according to the quadrant of the constellation where they are located, that is, to obtain the first compensation value $$\phi'(n)$$

and the second compensation value $$\phi'(n+1)$$

It needs to be noted that the step is the existing phase compensation technology, so the article will not repeat here.

In addition, an embodiment of the present document further provides a device for compensating a phase deviation, which is applied to a data sequence between a first training sequence and a second training sequence which are received by a receiving end, as shown in FIG. 7, including the following modules:

a first determination module, arranged to: determine a first phase difference between the first training sequence and a standard training sequence used for reference, and a second phase difference between the second training sequence and the standard training sequence;

a second determination module, arranged to: determine a subdata sequence requiring a phase compensation in multiple subdata sequences forming the data sequence according to the first phase difference and the second phase difference;

a calculation module, arranged to: calculate a phase compensation value corresponding to the subdata sequence requiring the phase compensation by using the first phase difference and the second phase difference; and a compensation module, arranged to: conduct the phase compensation on the subdata sequence requiring the phase compensation by using the phase compensation value corresponding to the subdata sequence.

It can be known from the above description that, the compensation device of the present embodiment divides a section of data sequence into multiple subdata sequences, and determines whether each subdata sequence requires the phase compensation according to two training sequences before and after the data sequence, and determines a phase compensation value corresponding to a subdata sequence requiring the phase compensation. Compared with the related art, the accuracy of the phase correction of the compensation device of the present document is much higher, therefore, in the transmission process, it can send a longer data sequence, that is, the compensation method of the present embodiment introduces less training sequence than the related art when transmitting same amount of data quantity, thus saving the bandwidth resources.

Further, on the basis of the above embodiment, the second determination module specifically includes:

a first determination submodule, arranged to: if the first phase difference is less than a first threshold and |the second phase difference subtracted by the first phase difference| is greater than a second threshold, then only determine that subdata sequences located in latter half of the data sequence require the phase compensation; and a second determination submodule, arranged to: if the first phase difference is greater than the first threshold, then determine that all the subdata sequences of the data sequence require the phase compensation.

It can be known through the above description that, when the first phase difference is less than the first threshold, then it is indicated that the difference of the phase of first training sequence A and the phase of the standard training sequence is in the permitted extent, and it is believed that the former half of the subdata sequence B1 near the first training sequence A does not need to perform the phase correction; if at that time, |the second phase difference subtracted by the first phase difference| is greater than a second threshold, then it is indicated that the phase difference between the phase of the second training sequence C and the phase of the first training sequence A is larger, which also means that there is a larger difference between the phase of the second training sequence C and the phase of the standard training sequence, and it is believed that the latter part of the subdata sequence B2 near the second training sequence C needs the phase correction. When the first phase difference is greater than the first threshold, then it is indicated that a phase deviation is occurred at the former half part of the subdata sequence B1, and often a phase deviation may also occur at the latter part of the subdata sequence B2 according to the experience, therefore, it is believed that all subdata sequences require the phase compensation.

Further, on the basis of the above embodiment, the calculation module specifically includes:

a calculation submodule, arranged to: calculate a first compensation value corresponding to the first phase difference and a second phase compensation value corresponding to the second phase difference;

a third determination submodule, arranged to: if the first phase difference is less than a first threshold and |the second phase difference subtracted by the first phase difference| is greater than a second threshold, then determine the compensation value of subdata sequences located in latter half of the data sequence as the second compensation;

a fourth determination submodule, arranged to: if the first phase difference is greater than the first threshold and |the second phase difference subtracted by the first phase difference| is greater than the second threshold, then determine the compensation value of subdata sequences located in former half of the data sequence as the first compensation value and determine the compensation value of subdata sequences located in latter half of the data sequence as the second compensation value; and a fifth determination submodule, arranged to: if the first phase difference is greater than the first threshold and |the second phase difference subtracted by the first phase difference| is less than the second threshold, then determine the compensation value of all subdata sequences of the data sequence as the first compensation value.

It can be known from the above description that, when only the latter half of the subdata sequence B2 requires the phase correction, it is clear that the compensation value corresponding to B2 is more likely to be the second compensation value corresponding to the second training sequence C which is closer to B2. There are two kinds of situations when the former half of the subdata sequence B1 requires the phase correction. One is that the phase ambiguity is occurred at multiple places of the whole data sequence B, and the gap between the phase deviation of B1 and the phase deviation of B2 is larger; obviously, at this time, the B1 is performed with the phase correction in accordance with the first compensation value, and the B2 is corrected in accordance with the second compensation value, which is much more reasonable. The other one is that the B1 requires the phase correction, and the phase difference of the phase of B2 and the phase of B1 is little, then it is indicated that there is a phase deviation across the regions of B1 and B2 in the whole data sequence B; at this time, it is only required to perform the phase correction to the whole section of the data sequence B in accordance with the first compensation value.

In addition, on the basis of the above embodiment, the calculation submodule specifically includes:

a quantization unit, arranged to: quantify the phase difference between the first training sequence and the standard training sequence, to obtain a first value possessing a phase; and quantify the phase difference between the second training sequence and the standard training sequence, to obtain a second value possessing the phase; and a calculation unit, arranged to: calculate the first compensation value according to the first value and a preset ideal constellation point, and calculate the second phase compensation value according to the second value and the preset ideal constellation point.

Herein, the quantization unit specifically includes:

a first determination subunit, arranged to: determine the phase difference between each symbol in the first training sequence and a corresponding symbol in the standard sequence, to obtain the phase difference of each symbol in the first training sequence;

a second determination subunit, arranged to: determine the phase difference between each symbol in the second training sequence and the corresponding symbol in the standard sequence, to obtain the phase difference of each symbol in the second training sequence;

a quantization subunit, arrange to: quantify the phase difference of each symbol in the first training sequence according to Euler's formula, to obtain a first quantization value possessing the phase of each symbol in the first training sequence, and quantify the phase difference of each symbol in the second training sequence according to Euler's formula, to obtain a second quantization value possessing the phase of each symbol in the second training sequence; and a calculation subunit, arranged to: calculate a mean value of all first quantization values, to obtain the first value possessing the phase, and calculate the mean value of all second quantization values, to obtain the second value possessing the phase.

Obviously, the compensation device of the present embodiment is corresponding to the compensation method of the present document. The technical effect which can be achieved by that compensation method can be achieved by the compensation device of the present embodiment similarly.

The above description is directed to specific embodiments of the present document. It should be pointed out, for those skilled in the art, a plurality of modifications and retouches also can be made without departing from the described principles of the present document, and all the modifications and retouches should be embodied in the scope of the present document.

INDUSTRIAL APPLICABILITY

As mentioned above, the method and device for compensating a phase deviation provided by the embodiment of the present document have the following beneficial effects: the accuracy of the phase correction is much higher, therefore, in the transmission process, it can send a longer data sequence, that is, the compensation method of the present embodiment introduces less training sequence than the related art when transmitting same amount of data quantity, thus saving the bandwidth resources.

What we claim is:

1. A method for compensating a phase deviation, comprising:
   receiving, by a receiving end, a data sequence between a first training sequence and a second training sequence;
   determining, by the receiving end, a first phase difference between the first training sequence and a standard training sequence used for reference, and a second phase difference between the second training sequence and the standard training sequence;
   determining, by the receiving end, a subdata sequence requiring a phase compensation in multiple subdata sequences forming the data sequence according to the first phase difference and the second phase difference;
   calculating, by the receiving end, a phase compensation value corresponding to the subdata sequence requiring the phase compensation by using the first phase difference and the second phase difference; and
   conducting, by the receiving end, the phase compensation on the subdata sequence requiring the phase compensation by using the phase compensation value corresponding to the subdata sequence.

2. The method according to claim 1, wherein, determining whether multiple subdata sequences forming the data sequence require the phase compensation according to the first phase difference and the second phase difference specifically comprises:
   if the first phase difference is less than a first threshold and |the second phase difference subtracted by the first phase difference| is greater than a second threshold, then determining that only subdata sequences located in latter half of the data sequence require the phase compensation; and
   if the first phase difference is greater than the first threshold, then determining that all the subdata sequences of the data sequence require the phase compensation.

3. The method according to claim 1, wherein, calculating the phase compensation value corresponding to the subdata sequence requiring the phase compensation by using the first phase difference and the second phase difference specifically comprises:

calculating a first compensation value corresponding to the first phase difference and a second phase compensation value corresponding to the second phase difference;

if the first phase difference is less than a first threshold and |the second phase difference subtracted by the first phase difference| is greater than a second threshold, then determining the compensation value of subdata sequences located in latter half of the data sequence as the second compensation value; and if the first phase difference is greater than the first threshold and |the second phase difference subtracted by the first phase difference| is greater than the second threshold, then determining the compensation value of subdata sequences located in former half of the data sequence as the first compensation value and determining the compensation value of subdata sequences located in latter half of the data sequence as the second compensation value; and if the first phase difference is greater than the first threshold and |the second phase difference subtracted by the first phase difference| is less than the second threshold, then determining the compensation value of all subdata sequences of the data sequence as the first compensation value.

4. The method according to claim 3, wherein, calculating the first compensation value corresponding to the first phase difference and the second compensation value corresponding to the second phase difference specifically comprises:

quantifying the phase difference between the first training sequence and the standard training sequence, to obtain a first value possessing a phase; and quantifying the phase difference between the second training sequence and the standard training sequence, to obtain a second value possessing the phase; and calculating the first compensation value according to the first value and a preset ideal constellation point, and calculating the second phase compensation value according to the second value and the preset ideal constellation point.

5. The method according to claim 4, wherein, quantifying the phase difference between the first training sequence and the standard training sequence to obtain the first value possessing the phase; and quantifying the phase difference between the second training sequence and the standard training sequence to obtain the second value possessing the phase specifically comprises:

determining the phase difference between each symbol in the first training sequence and a corresponding symbol in the standard sequence, to obtain the phase difference of each symbol in the first training sequence;

determining the phase difference between each symbol in the second training sequence and a corresponding symbol in the standard sequence, to obtain the phase difference of each symbol in the second training sequence;

quantifying the phase difference of each symbol in the first training sequence according to Euler's formula, to obtain a first quantization value possessing the phase of each symbol in the first training sequence, and quantifying the phase difference of each symbol in the second training sequence according to Euler's formula, to obtain a second quantization value possessing the phase of each symbol in the second training sequence; and calculating a mean value of all first quantization values, to obtain the first value possessing the phase, and calculating the mean value of all second quantization values, to obtain the second value possessing the phase.

6. A device for compensating a phase deviation, which is applied to a data sequence between a first training sequence and a second training sequence which are received by a receiving end, comprising:

a first determination module, arranged to: determine a first phase difference between the first training sequence and a standard training sequence used for reference, and a second phase difference between the second training sequence and the standard training sequence;

a second determination module, arranged to: determine a subdata sequence requiring a phase compensation in multiple subdata sequences forming the data sequence according to the first phase difference and the second phase difference;

a calculation module, arranged to: calculate a phase compensation value corresponding to the subdata sequence requiring the phase compensation by using the first phase difference and the second phase difference; and a compensation module, arranged to: conduct the phase compensation on the subdata sequence requiring the phase compensation by using the phase compensation value corresponding to the subdata sequence.

7. The apparatus according to claim 6, wherein, the second determination module comprises:

a first determination submodule, arranged to: if the first phase difference is less than a first threshold and |the second phase difference subtracted by the first phase difference| is greater than a second threshold, then determine that only subdata sequences located in latter half of the data sequence require the phase compensation; and a second determination submodule, arranged to: if the first phase difference is greater than the first threshold, then determine that all the subdata sequences of the data sequence require the phase compensation.

8. The device according to claim 6, wherein, the calculation module comprises:

a calculation submodule, arranged to: calculate a first compensation value corresponding to the first phase difference and a second phase compensation value corresponding to the second phase difference;

a third determination submodule, arranged to: if the first phase difference is less than a first threshold and |the second phase difference subtracted by the first phase difference| is greater than a second threshold, then determine the compensation value of subdata sequences located in latter half of the data sequence as the second compensation value; and a fourth determination submodule, arranged to: if the first phase difference is greater than the first threshold and |the second phase difference subtracted by the first phase difference| is greater than the second threshold, then determine the compensation value of subdata sequences located in former half of the data sequence as the first compensation value and determine the compensation value of subdata sequences located in latter half of the data sequence as the second compensation value; and a fifth determination submodule, arranged to: if the first phase difference is greater than the first threshold and |the second phase difference subtracted by the first phase difference| is less than the second threshold, then determine the compensation value of all subdata sequences of the data sequence as the first compensation value.

9. The device according to claim 8, wherein, the calculation submodule comprises:

a quantization unit, arranged to: quantify the phase difference between the first training sequence and the standard training sequence, to obtain a first value possessing a phase; and quantify the phase difference between the second training sequence and the standard training sequence, to obtain a second value possessing the phase; and a calculation unit, arranged to: calculate the first compensation value according to the first value and a preset ideal constellation point, and calculate the second phase compensation value according to the second value and the preset ideal constellation point.

10. The device according to claim 9, wherein, the quantization unit comprises:

a first determination subunit, arranged to: determine the phase difference between each symbol in the first training sequence and a corresponding symbol in the standard sequence, to obtain the phase difference of each symbol in the first training sequence;

a second determination subunit, arranged to: determine the phase difference between each symbol in the second training sequence and the corresponding symbol in the standard sequence, to obtain the phase difference of each symbol in the second training sequence;

a quantization subunit, arranged to: quantify the phase difference of each symbol in the first training sequence according to Euler's formula, to obtain a first quantization value possessing the phase of each symbol in the first training sequence, and quantify the phase difference of each symbol in the second training sequence according to Euler's formula, to obtain a second quantization value possessing the phase of each symbol in the second training sequence; and a calculation subunit, arranged to: calculate a mean value of all first quantization values, to obtain the first value possessing the phase, and calculate the mean value of all second quantization values, to obtain the second value possessing the phase.

\* \* \* \* \*